Dec. 10, 1935.  E. F. WEMHOENER  2,024,122
FILTER
Filed April 6, 1933
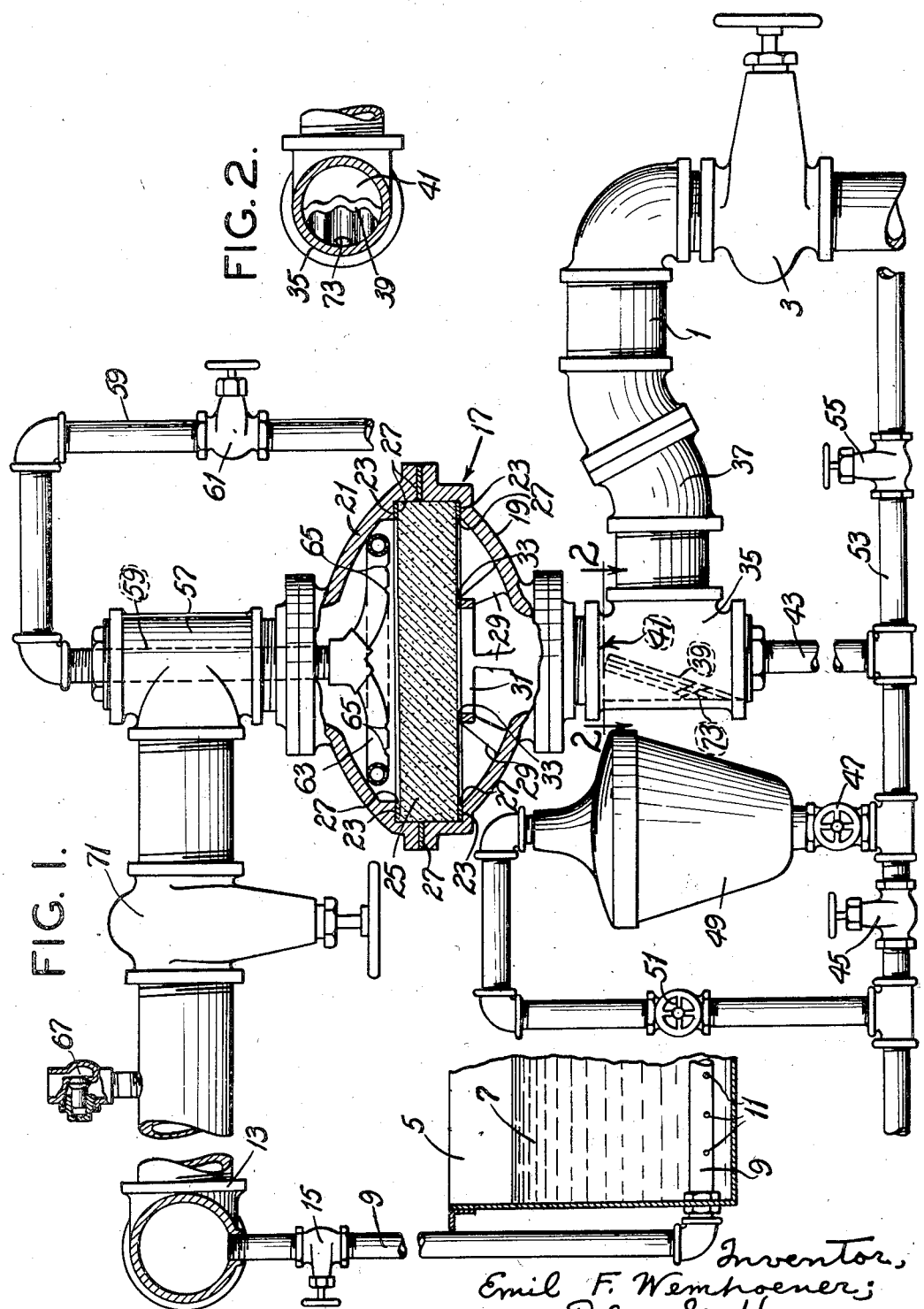
Inventor,
Emil F. Wemhoener;
Delos G. Haynes,
Attorney.

Patented Dec. 10, 1935

2,024,122

UNITED STATES PATENT OFFICE 2,024,122

FILTER

Emil F. Wemhoener, University City, Mo., assignor to Universal Boiler Filter Corporation, St. Louis, Mo., a corporation of Missouri Application April 6, 1933, Serial No. 664,700

3 Claims. (Cl. 183—44)

This invention relates to filters, and with regard to certain more specific features, to a filter for treating vapors such as steam gases and the like.

Among the several objects of the invention may be noted the provision of a filter which is adapted to remove from steam and the like a larger fraction than heretofore of oil, water in liquid state and like undesirable material; the provision of a filter or separator of the class described which positively separates said impurities and which includes a means for positively but simply eliminating them from the apparatus; and the provision of apparatus of the class described which shall be rugged and compact in arrangement and safe in operation in both small and large sizes. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawing, in which is illustrated one of various possible embodiments of the invention, Fig. 1 is a side elevation of the apparatus constituting the invention, parts being broken away for clarity; and, Fig. 2 is a horizontal section taken on line 2—2 of Fig. 1, the same showing a baffle.

Similar reference characters indicate corresponding parts throughout the several views of the drawing.

Heretofore, exhaust steam from power generating equipment and the like has often gone to waste where it might have been used for processing had it not been for impurities in the steam. For instance, in a meat packing plant, the exhaust used from power generating engines, turbines and the like is often considerable but it can not be used for directly processing the meat for it can not be allowed to come into contact therewith because of the oil which the steam carries from the power generating equipment. Even such quantities as sometimes come over with the exhaust steam of a turbine are deleterious to food processing.

Prior oil separators have been unsuccessful in this connection because, although they do remove some fraction of the oil, they do not do it successfully enough to make the issuing steam useful for direct contact with food products or the like requiring pure processing fluid. The present invention removes from the steam substantially all the oil and other impurities so that the steam may be used directly for food processing, either in the vapor or liquid form. It is to be understood that food processing is an example of that class of processes requiring a high degree of water purity. The invention is also useful for removing water globules and slugs from the steam, thus effecting a drying action. Furthermore, it removes other impurities such as rust, grit etc.

Referring now more particularly to Fig. 1, there is shown at numeral 1, an exhaust steam line having a cut-off valve 3 therein, said line leading from a suitable steam supply such as from an engine, turbine or the like, or said line may proceed from the boiler which supplies the steam. The device is also highly useful in the latter case because boilers often send oil into the lines from reclaimed condensate initially sent to the boilers. As above shown, it is desirable that the exhaust steam be in a condition so that it may be used for process purposes, as for instance, in a processing vessel or cooker such as shown at numeral 5 wherein meat or other food or the like is prepared.

The processing vessel 5 is exemplary of many types that might be used. It carries a mass of water 7. At the bottom of the vessel 5 is located a pipe 9 having openings 11 therein permitting escape into the water 7 of exhaust steam. The pipe 9 is an example of one of a plurality of such pipes leading from a header 13. Each pipe 9 carries a valve 15 for cutting off the flow of purified steam to the respective vessel 5.

The apparatus in the present invention is placed between the supply line 1 and the header 13. It comprises a casing 17 formed in two halves 19 and 21, having shoulders 23 whereby they may be bolted together and drawn up against an interposed porous stone-like diaphragm 25. Gaskets 27 are used between the halves of the casing and between the respective halves thereof and the stone. The lower half 19 of the casing carries supporting arms 29 for a supporting ring 31 below the stone 25. A gasket 33 is also used between the supporting ring 31 and the stone 25.

I have found it preferable to compose the diaphragm or disc 25 of a carbon compound such as carborundum (SiC) or the like, the same being hard, of sharp grain and porous. It is to be understood, however, that under certain conditions, other stones may be used.

The casing 17 is connected to the line 1 by means of a T 35 so arranged that the line 1 has a depressed portion 37 effecting a trap as it enters the T 35. The purpose of this will be shown hereinafter. A baffle 39 is formed within the T against which the incoming steam strikes to preliminarily deposit and have deflected therefrom oil, moisture, and other impurities. From the deflector 39, the steam flows up through the passage 41 into the casing 17 and through the stone 25 and to the header 13, from whence the steam is distributed as required through the pipes 9. In passing through the diaphragm 25, substantially all of the oil in the steam, whether it is in globular or emulsified form, is positively separated. Entrained moisture is likewise separated and this feature is of advantage where dry steam is desired.

The separated material returns by gravity from the casing 17 and baffle 39, through the T fitting 35 into a drain pipe 43 provided therefor, this pipe 43 leading to the waste. A valve 45 in the waste pipe 43 is normally closed, thus forcing the waste to proceed through an open valve 47, a steam trap 49 and open valve 51 to a continuation of the pipe 43 on the other side of said valve 45. The valve 47, trap 49 and valve 51 with their pipe and pipe fittings, constitute a by-pass around the valve 45. A branch 53 having a normally closed valve 55 therein also passes to waste 43. It is intended that the valve 55 shall be adjacent to the valve 3 for convenience in operation. The valves 47 and 51 may be at a distance from the casing 17.

The steam passes from the casing 17 to the header 13 by way of a T 57. Through this T 57 is fitted a hot-water pipe 59 having a valve 61 therein for permitting and stopping flow therethrough. The pipe 59 extends downwardly through the T 57 and into the upper half of the casing 27 where it is provided with a spreader ring 63 having spray openings 65 around the lower periphery thereof.

The operation of the device is as follows:

The valve 3 is opened, and a valve 71 in the header 13 is also opened. As many of the valves 15 are opened as are required for the process work in hand. Hence, the steam flows from the pipe 1, strikes the baffle 39, depositing some of the oil, moisture and the like therein which runs down the waste pipe 43. The remainder of the steam passes up through the porous stone 25 and around the pipe 59 in the T 57, to the header 13, through the valve 65 and from thence to the processing vessel.

An outwardly closing check valve 67 prevents escape of steam under pressure from the header 13. The purpose of the check valve 67 is to prevent drawing back of the water 7 into the line 13, should the supply of steam fail from the supply pipe 1 and subsequent condensation occur in the pipe 13. In such case, the check valve 67 opens to draw air into the pipe 13 instead of the water 7 being drawn up. Such a valve 67 is not required where the distance between the header 13 and liquid level of the vessel 5 is greater than of the order of thirty feet.

Under the above conditions, the separated impurities from the stone 25 and the baffle 39 flow down through the pipe 43, and, the valves 45 and 55 being shut, these impurities emerge from the pipe 43 by way of the separator 49 and the valve 51 the same by-passing said closed valve 45. The valve 55 in the other branch line to the waste is, as stated, at this time closed. It is to be understood that in the present example approximately a three-pound pressure is carried in the line 1.

When the stone becomes clogged with impurities on its under side such that the flow of steam is impeded, the valve 3 is cut off, thus preventing further steam flow. The hot water valve 61 is then opened, thus ejecting water under pressure from the openings 65. The water is at a substantial pressure, for example of the order of 60 pounds per square inch and it is thus positively forced through the stone 25 to clear away the impurities on the bottom thereof. The support 31 prevents the water pressure from breaking the stone. The back-washing water with the entrained impurities passes through the T 35. In order that this material may drain from behind the baffle 39, there is provided a drain hole 73 at the bottom of said baffle.

It is not desirable that the material which is washed out with the water should pass through the trap 49 although it may do so. If it is desired that it should not pass through the trap, the valve 55 may be opened. Thus the line 53 functions as an auxiliary for draining. If it is desired to positively shut off the trap 49, the valve 47 may also be closed. Also, the valve 45 may be opened.

After the cleaning operation has been completed, the valves are restored to their former positions for effecting flow of steam as described.

The purpose of the depressed trap-forming portion 37 of the pipe 1 is to prevent the back-washed material from flowing back into and down the pipe 3.

From the above it will be seen that this separator distinguishes from centrifugal and baffle types of separators heretofore on the market in that the steam must pass through a unitary mass having a porous consistency, the same being composed of material which is of a sharp enough granular structure that materials such as emulsified oil are caught. The device thus also distinguishes from those in which wood or steel shavings, textile waste and the like are used where such sharp granular structure is not present.

The back washing feature by means of a fluid other than that which is being filtered is advantageous, permitting of a simpler and more compact arrangement than if a steam backwash were used, and this is made possible by the use of the stone, in contradistinction to the use of other substances such as loose sand.

Furthermore, the fact that back washing is accomplished at a pressure difference across the diaphragm which is greater than the pressure difference during direct, filtering flow ensures positive and complete removal of all lodged impurities from the stone. This removal is effected in a short time as a result of said excess pressure. It will be seen that if a given pressure prevails while the material is lodged, a higher pressure for dislodging it will be more effective in a shorter time interval. The hot water being more dense than the steam and under higher pressure insures complete dislodgment of impurities.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawing shall be interpreted as illustrative and not in a limiting sense.

I claim:

1. In an apparatus of the class described, the combination of a hollow body member separable along a medial line into two sections, each section being provided along its line of separation with a marginal flange and an annular seat, the flanges of said sections being adapted to be secured together, a disk of stone-like porous material engaging said seats and clamped between said sections and dividing said member into an inlet chamber and an outlet chamber, a T-connection secured to said inlet chamber section, a steam pipe connected to said T-connection, a valve in said steam pipe, a drain pipe leading from the lowermost part of said T-connection, a T-connection secured to said outlet section, a steam pipe connected to said T-connection, a valve in said steam pipe, a water pipe extending through said T-connection into said outlet chamber, a ring-shaped discharge member connected to said water pipe and arranged in said outlet chamber in close proximity to said filter disk, and a valve in said water pipe whereby water under pressure can be discharged into said outlet chamber and passed through said filter disk to wash off the matter accumulated on the inlet side thereof and carried away through said drain pipe.

2. In an apparatus of the class described, the combination of a hollow member separable into two sections, said sections being provided at their opposed ends with cooperating marginal seats, a horizontally disposed filter member of stone-like porous material engaging said seats and clamped in position between said sections, thereby dividing said member into an inlet and an outlet chamber, a T-connection secured at one end to said inlet section, a drain pipe leading from the opposite end of said T-connection, a steam inlet pipe connected laterally to said T-connection for admitting steam thereinto, a baffle plate disposed in said T-connection between said steam pipe and said inlet section to provide initial separation of oil from the steam, a steam pipe connected to the outlet section for conveying away steam whereby oil and other matter is arrested on the inlet side of said filter member and only pure steam is passed through the latter, a water pipe connected to said outlet section for admitting water thereinto under substantially greater pressure than the steam pressure, whereby water is forced through said filter member from said outlet chamber into said inlet chamber and thereby washes oil and other matter from the inlet side of said filter member and carries it away through said drain pipe.

3. In an apparatus for separating oil from steam, the combination of a hollow member formed in two sections separable along a medial line, said sections being provided on their opposed ends with annular seats and marginal flanges whereby said sections can be clamped together, a disk of porous stone-like material clamped between said sections and having its ends disposed in the respective seats whereby said member is divided into an inlet chamber disposed within the lower section and an outlet chamber disposed within the upper section, a T-connection connected at its upper end to said inlet section, a drain pipe connected to the lower end of said T-connection, a steam pipe connected laterally to said T-connection, a baffle plate arranged in said T-connection between its point of connection with said steam pipe and said inlet section to provide initial separation of oil from steam, a pipe connected to the outlet section for conveying away steam filtered through said disk, a water pipe connected to said outlet section for admitting water under substantially high pressure to said outlet section and forcing it through said stone into said inlet section to wash off the inlet side thereof and carry the oil and other material away through said drain pipe, and means fixed to said inlet section and engaging the underside of said filter disk for reinforcing the same against said water pressure.

EMIL F. WEMHOENER.